United States Patent
Fujita et al.

(10) Patent No.: US 10,754,307 B2
(45) Date of Patent: Aug. 25, 2020

(54) TEACHING DEVICE AND CONTROL INFORMATION GENERATION METHOD

(71) Applicant: FUJI CORPORATION, Chiryu-shi (JP)

(72) Inventors: Masatoshi Fujita, Anjo (JP); Seigo Kodama, Yatomi (JP)

(73) Assignee: FUJI CORPORATION, Chiryu-shi (JP)

( * ) Notice: Subject to any disclaimer, the term of this patent is extended or adjusted under 35 U.S.C. 154(b) by 160 days.

(21) Appl. No.: 15/556,185

(22) PCT Filed: Mar. 20, 2015

(86) PCT No.: PCT/JP2015/058427
§ 371 (c)(1),
(2) Date: Sep. 6, 2017

(87) PCT Pub. No.: WO2016/151668
PCT Pub. Date: Sep. 29, 2016

(65) Prior Publication Data
US 2018/0046152 A1     Feb. 15, 2018

(51) Int. Cl.
*B25J 9/16*     (2006.01)
*G05B 19/423*     (2006.01)
(Continued)

(52) U.S. Cl.
CPC .......... *G05B 13/0265* (2013.01); *B25J 9/161* (2013.01); *B25J 9/163* (2013.01); *B25J 9/1664* (2013.01);
(Continued)

(58) Field of Classification Search
CPC .......... B25J 9/161; B25J 9/163; B25J 9/1664; G05B 13/0265; G05B 19/402;
(Continued)

(56) References Cited

U.S. PATENT DOCUMENTS

2005/0143861 A1   6/2005   Watanabe et al.
2007/0145027 A1   6/2007   Izawa et al.
(Continued)

FOREIGN PATENT DOCUMENTS

DE   10 2012 009 010 A1   12/2012
JP   02-148111 A   6/1990
(Continued)

OTHER PUBLICATIONS

JPH10264059, machine translation (Year: 1998).*
(Continued)

*Primary Examiner* — Ryan Rink
(74) *Attorney, Agent, or Firm* — Oblon, McClelland, Maier & Neustadt, L.L.P.

(57) ABSTRACT

A teaching device capable of teaching not only movement work but also more detailed working content. The teaching device is provided with input section for inputting work information such as work of pinching workpieces which is carried out by a robot arm at a working position. When carrying out motion capture by moving jig (an object which mimics the robot arm) which is provided with marker section, a user manipulate input section at an appropriate timing to input the working content to be performed by the robot arm as work information, and thus it is possible to set fine working content of the robot arm in teaching device. Accordingly, teaching device is capable of linking positional information of jig and the like and work information generating control information for controlling the robot arm.

15 Claims, 8 Drawing Sheets

(51) Int. Cl.
*G05B 13/02* (2006.01)
*G05B 19/402* (2006.01)
*G05B 19/406* (2006.01)

(52) U.S. Cl.
CPC ......... *G05B 19/402* (2013.01); *G05B 19/406* (2013.01); *G05B 19/423* (2013.01); *G05B 2219/33321* (2013.01); *G05B 2219/36442* (2013.01); *G05B 2219/36453* (2013.01); *G05B 2219/36494* (2013.01); *G05B 2219/40391* (2013.01); *Y10S 901/03* (2013.01)

(58) Field of Classification Search
CPC .............. G05B 19/406; G05B 19/423; G05B 2219/33321; G05B 2219/36442; G05B 2219/36453; G05B 2219/36494; G05B 2219/40391; Y10S 901/03
See application file for complete search history.

(56) References Cited

U.S. PATENT DOCUMENTS

| | | | | |
|---|---|---|---|---|
| 2010/0153061 | A1* | 6/2010 | Hietmann | B25J 9/1692 702/152 |
| 2011/0238215 | A1* | 9/2011 | Yanagawa | G05B 19/42 700/258 |
| 2014/0148820 | A1 | 5/2014 | Ogawa et al. | |
| 2014/0297030 | A1* | 10/2014 | Iwasaki | G05B 19/416 700/245 |
| 2015/0362910 | A1* | 12/2015 | Makino | G05B 19/402 700/186 |
| 2016/0052132 | A1* | 2/2016 | Kim | B25J 9/0081 700/256 |
| 2019/0046271 | A1* | 2/2019 | Dekel | A61B 17/24 |

FOREIGN PATENT DOCUMENTS

| | | |
|---|---|---|
| JP | 06-102919 A | 4/1994 |
| JP | 10-264059 A | 10/1998 |
| JP | 2004-261878 A | 9/2004 |
| JP | 2004-348250 A | 12/2004 |
| JP | 2005-196242 A | 7/2005 |
| JP | 2011-200997 A | 10/2011 |
| JP | 2013-34835 A | 2/2013 |

OTHER PUBLICATIONS

International Search Report dated Jun. 23, 2015 in PCT/JP2015/058427 filed Mar. 20, 2015.

Office Action dated Oct. 2, 2018 in Japanese Patent Application No. 2017-507137 (with unedited computer generated English translation).

Extended European Search Report dated Oct. 5, 2018 in Patent Application No. 15886225.0, 9 pages.

Billard, A. et al., "Robot Programming by Demonstration" Robot Programming by Demonstration, XP055302667, May 20, 2008, pp. 1371-1394.

* cited by examiner

TEACHING DEVICE AND CONTROL INFORMATION GENERATION METHOD

TECHNICAL FIELD

The present application relates to a teaching device for teaching operations to a robot and a method which generates control information for controlling the robot.

BACKGROUND ART

In recent years, there has been progress in the automation of work using industrial robots in an effort to reduce labor at production sites. There is an industrial robot, for example, which, in a robot arm, is provided with a so-called parallel link mechanism that supports one end effector using multiple arm sections which are arranged in parallel, and there is an industrial robot such as an articulated robot which is provided with a serial link mechanism that connects multiple arm sections in one direction and supports an end effector.

In the related art, there is a teaching device in which a person mimics the work to be performed by a robot arm, the operations of the mimicking person are acquired by motion capture, and the robot arm is taught (for example, PTL 1). In the teaching device disclosed in PTL 1, when an operator operates a measurement device ("motion capture" in the literature) in a state in which the measurement device is worn on the hand, based on the three-dimensional coordinate data which is transmitted from the measurement device, the position of the measurement device is sampled at a predetermined sampling interval. The teaching device calculates the movement position, the movement speed, and the like based on the sampled data and controls the arm section to move to the calculated movement position at the movement speed.

PTL 1: JP-A-2011-200997

SUMMARY

Technical Problem

However, in the teaching device, for example, it is possible to calculate and teach the movement position and the movement speed of the arm section, but difficult to mimic the fine work of the end effector at the supply position and the attachment position of the component with the fingers of a person.

In a case in which it is desired to incorporate different work from the work which is carried out by the arm section or the end effector such as movement work or attachment work, for example, a correction process in which the working position of the end effector is adjusted by imaging a reference point in the device and performing an image processing, or the like into a series of work processes according to the movement of the arm section, in the teaching device of the related art, it is difficult to instruct which kind of work to incorporate at which timing. For this reason, for example, the control information is created once using the motion capture and then work of searching for which step of the main program of the created control information after which to add a subroutine corresponding to the correction process or the like becomes necessary.

The present disclosure is made in consideration of these problems, and an object of the present disclosure is to provide a teaching device and a control information generation method which are capable of teaching not only movement work but also more detailed working content.

Solution to Problem

In order to solve the problems, a teaching device according to an aspect the present application is a teaching device which generates control information for controlling operations of a robot that is provided with a moving section and a working section which is provided on the moving section, the teaching device including a jig which includes a positional marker section indicating a position of the moving section, a detecting section which detects the positional marker section which moves together with movement of the jig, an input section which inputs work information relating to work which is carried out by the working section at a working position, and a processing section which processes detection data which is obtained by the detecting section detecting the positional marker section and the work information from the input section, in which the processing section performs a positional information generation process of generating positional information of three-dimensional coordinates of the positional marker section based on the detection data, a movement information generation process of generating movement information relating to a movement direction and a movement speed of the positional marker section based on the positional information, and a control information generation process of generating the control information of a series of work tasks which cause the moving section to move according to the positional information and the movement information and cause the working section to perform work according to the work information.

According to the teaching device according an aspect of the present disclosure, the jig includes a movable section, a driving section which drives the movable section, and a movable section marker section indicating a position of the movable section, and the processing section generates the positional information of the movable section marker section which moves together with the movable section operating based on the driving of the driving section as the positional information generation process.

According to the teaching device according to an aspect of the present disclosure, in the control information generation process, after moving the moving section, the processing section adds control information for correcting a position of the working section at the working position as the control information to be performed before carrying out the work of the working section.

According to the teaching device according to an aspect of the present disclosure, in the positional information generation process, the processing section performs a correction process of extracting multiple feature points from among the generated positional information and approximating the positional information between the feature points.

According to the teaching device according to an aspect of the present disclosure, as the positional information generation process, the processing section samples a position of the positional marker section based on the detection data and generates a position of a sampling point as the positional information.

According to the teaching device according to an aspect of the present disclosure, as the movement information generation process, the processing section detects the movement direction based on a positional relationship between adjacent of the sampling points in multiple of the sampling points which are generated by the positional information generation process and measures the movement speed based on a distance between the adjacent sampling points and a sampling cycle.

According to the teaching device according to an aspect of the present disclosure, as the movement information generation process, the processing section corrects the positional information in a case of at least one of a case in which a curvature of a curved line joining the sampling points exceeds a predetermined curvature, a case in which the movement speed exceeds a predetermined speed, and a case in which an acceleration in the movement speed exceeds a predetermined acceleration.

According to the teaching device according to an aspect of the present disclosure, the teaching device further includes a reference marker section which is provided in a position which serves as a reference to operations of the robot, in which the detecting section detects the reference marker section, and in which in the positional information generation process, the processing section generates a relative position of the positional marker section with respect to the reference marker section as the positional information.

According to the teaching device according to an aspect of the present disclosure, the robot includes a serial link mechanism as a driving mechanism of the moving section.

In order to solve the problems, a control information generation method according to an aspect of the present application is a control information generation method for controlling operations of a robot that is provided with a moving section and a working section which is provided on the moving section, in which the control information generation method causes a teaching device including a jig which includes a positional marker section indicating a position of the moving section, a detecting section which detects the positional marker section which moves together with movement of the jig, and an input section which inputs work information relating to work which is carried out by the working section at a working position to perform a positional information generation step of generating positional information of three-dimensional coordinates of the positional marker section based on detection data which is obtained by the detecting section detecting the positional marker section, a movement information generation step of generating movement information relating to a movement direction and a movement speed of the positional marker section based on the positional information, and a control information generation step process of generating the control information of a series of work tasks for causing the moving section to move according to the positional information and the movement information and causing the working section to perform work according to the work information.

Advantageous Effects

In the teaching device according to the present application, control information for controlling the robot which is provided with the moving section and the working section is generated. In the work of the motion capture, by using the jig which is provided with the positional marker section as a detection target body, it is no longer necessary to use the hand or the like of a person who wears the measurement device. For example, for the detection method of the positional marker section, it is possible to use motion capture of an optical system which exposes the positional marker section to light of a specific wavelength and calculates the positional information and the like from the captured image data in which the reflected light is captured. The detection method of the positional marker section is not limited thereto, and another method may be used, for example, an image processing which detects the shape of the positional marker section in the captured image data and detects the position from the results. Alternatively, it is possible to use motion capture of a magnetic system which uses a magnetic sensor as the positional marker section, receives positional data from the moving magnetic sensor, and calculates the positional information and the like from the received positional data.

The teaching device is provided with an input section for inputting work information relating to work which is carried out by the working section at the working position, for example, work such as pinching a workpiece, gripping a workpiece, emitting a laser, performing imaging, and picking and placing a workpiece. Therefore, the user operates the input section at the appropriate timing and inputs the working content to be performed by the robot as the work information, and thus it is possible to set fine work or the like of the working section in the teaching device.

The processing section generates the control information of a series of work tasks which cause the moving section to move according to the positional information and the movement information which are generated from the detection data and cause the working section to perform work according to the work information. In other words, in the control information generation process, the processing section is capable of linking the movement information and the like and the work information and the like and generating the control information. Accordingly, in the teaching device, for example, it is possible to incorporate the correction process which adjusts the working position of the working section or the like into the series of work processes according to the movement of the moving section such that the correction process is carried out at an appropriate timing and working content.

In the teaching device according to the present application, the jig is provided with a driving section which drives the movable section which is provided with a movable section marker. The processing section performs motion capture on the movable section marker of the movable section which is capable of moving according to the driving of the driving section. Accordingly, in comparison to a case in which the user mimics using their fingers by causing the movable section to operate using the driving section at a predetermined working position, it is possible to more faithfully reproduce the operations of gripping and separating the workpiece.

For example, in a case in which a person moves the jig by hand, the precision of the movement of the positional marker section relies on the precision of the person manipulating the jig. Therefore, in the teaching device according to the present application, in a case in which higher working precision is demanded, it is possible to support work in which high precision is demanded by carrying out a process of positional correction before carrying out the work at the working position, and by correcting the final working position.

In the teaching device according to the present application, the processing section performs the extraction of feature points and a correction process of approximating the positional information between the feature points. For the extraction of the feature points, for example, points in which the movement direction is modified by greater than or equal to a predetermined angle are extracted as feature points. Alternatively, for the extraction of the feature points, for example, points for every fixed interval from among multiple items of positional information are extracted as feature points.

The processing section sets the extracted feature points as the starting point and the end point of an operation of the robot, for example, and corrects the positional information between the feature points such that the robot is capable of moving from the starting point toward the end point. For example, for the correction process, in a case in which a point with a greatly deviated position is present between the feature points due to external noise, the positional information relating to the relevant point is discarded as unnecessary data. Alternatively, for the correction process, the positional information between the feature points is approximated with a straight line and a curved line that join the relevant feature points. Accordingly, it is possible to cause the robot to operate more smoothly based on the generated control information and to omit wasteful operations to improve the work efficiency. Thus, it possible to correct the deviation of positional information due to shaking of the hand of a person in a case in which the jig is manipulated by a person.

In the teaching device according to the present application, the processing section generates positional information from the detection data at a predetermined sampling cycle. Therefore, in the teaching device, by modifying the time of the sampling cycle, it is possible for the processing section to adjust the precision with which the position of the positional marker section is detected.

In the teaching device according to the present application, the processing section detects the movement direction and the movement speed based on the positional information of the adjacent sampling points. Therefore, in the teaching device, by modifying the time of the sampling cycle, it is possible for the processing section to adjust the precision with which the movement direction and the movement speed of the positional marker section are detected.

For example, in a case in which a person manipulates the jig and the orientation, the movement speed, and the acceleration of the jig exceed the movement capability of the robot, even if the control information is generated, it is difficult to cause the robot to perform the desired work. Therefore, in the teaching device according to the present application, for example, in a case in which the curvature of the curved line joining the sampling points exceeds the predetermined curvature (for example, a curvature at which the robot is capable of moving), the positional information (the coordinates or the like) is corrected to obtain a curvature at which movement is possible. Accordingly, it is possible to easily use the control information which is generated by the motion capture as the data which actually controls the robot.

In a case in which the motion capture is performed, there is a concern that deviation will arise in the position between the tracking region in which the operations of the jig are tracked and the working region in which the robot is actually caused to work. Therefore, in the teaching device according to the present application, the positional information generated using the reference marker section as a reference. Accordingly, in a in which the generated control information is used, it is possible to precisely control the robot by aligning the position of the reference marker section to a reference within the actual working region. The reference within the working region referred to here is, for example, a position serving as a reference when determining the positions in the X-direction and the Y-direction in the case of an XY-robot.

For example, in a case of taking in control information to a tool for simulation (such as three-dimensional CAD) and checking the movement of the robot, it is easy to take in and use the control information by aligning the position of the reference marker section to the reference position of the tool. For example, by using the same reference marker section to generate the control information of two robots separately and simulating the positions of the reference marker sections of two items of the control information aligned to the reference position of the tool, it is possible to check whether the operations of the two robots interfere with each other.

In the teaching device according to the present application, it is effective to apply the robot of the present application to a robot which is provided with a serial link mechanism that is widely used in a production site, for example, an articulated robot arm.

The present application is not limited to the teaching device and can also be implemented as a method of generating the control information using a teaching device.

DESCRIPTION OF EMBODIMENTS

Figure 1:
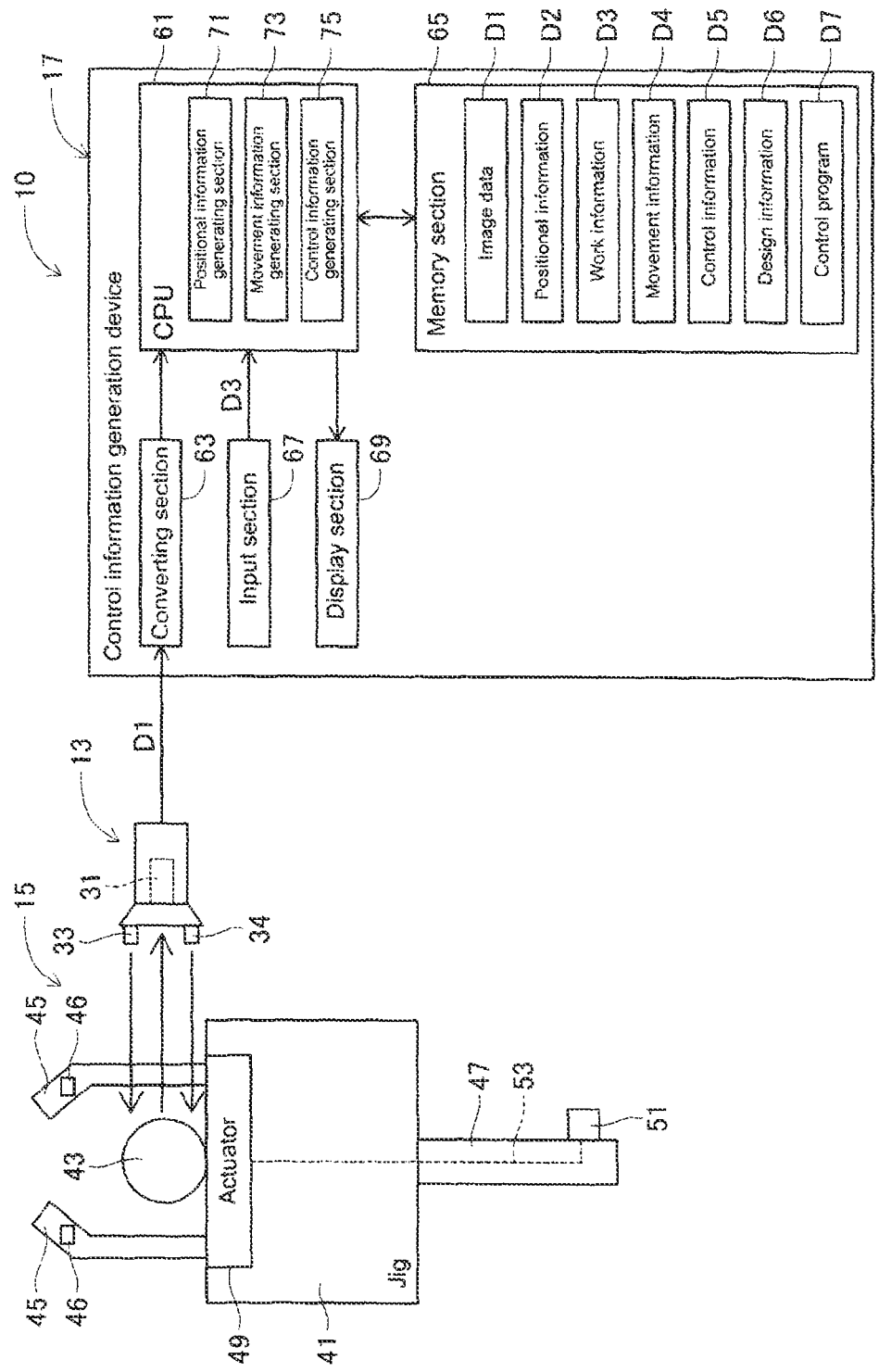
FIG. 1 is a diagram schematically illustrating the configuration of main parts of a teaching device of the present embodiment.
Figure 3:
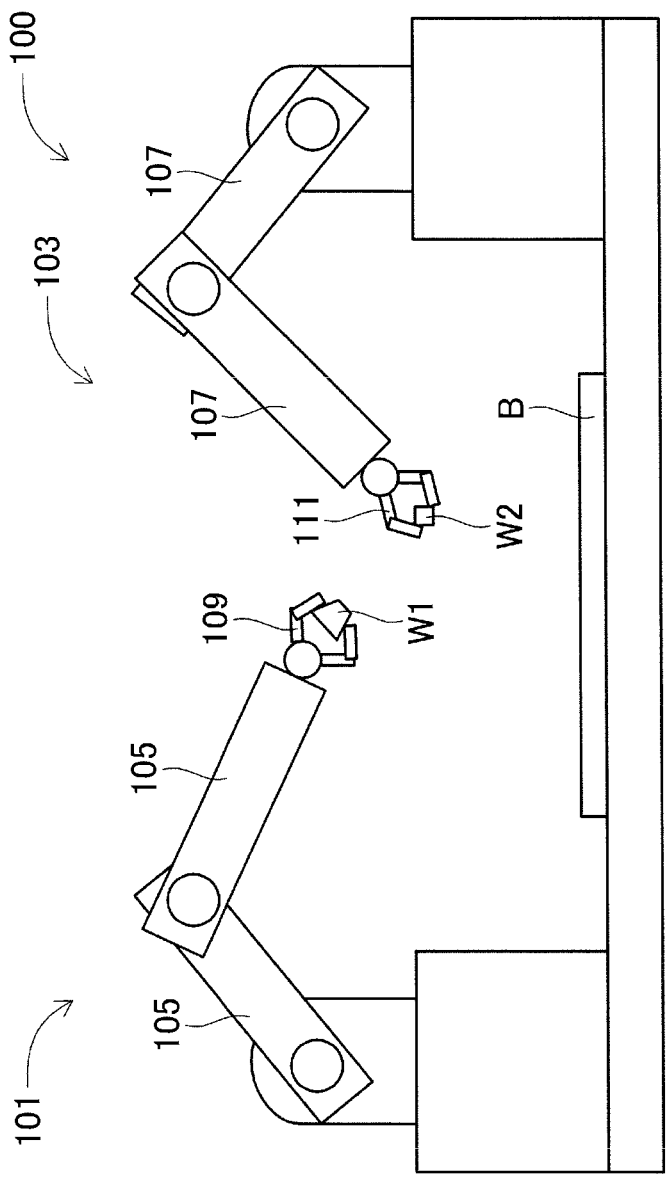
FIG. 3 is a schematic diagram illustrating the configuration of an industrial robot which is a target to be controlled using control information.

Hereinafter, an embodiment of the teaching device of the present disclosure will be described with reference to the drawings. FIG. 1 schematically illustrates the configuration of the main parts of a teaching device 10 of the present embodiment. Teaching device 10 is provided with multiple cameras 13 (only one illustrated in FIG. 1), two jigs 15 (only one illustrated in FIG. 1), and control information generation device 17 according to optical system motion capture. Teaching device 10 images each of the movements of jigs 15 using the multiple cameras 13 and generates control information D5 for controlling robot arms 101 and 103 which are illustrated in FIG. 3 from captured image data D1 of cameras 13 using control information generation device 17.

Regarding Cameras 13

Figure 2:
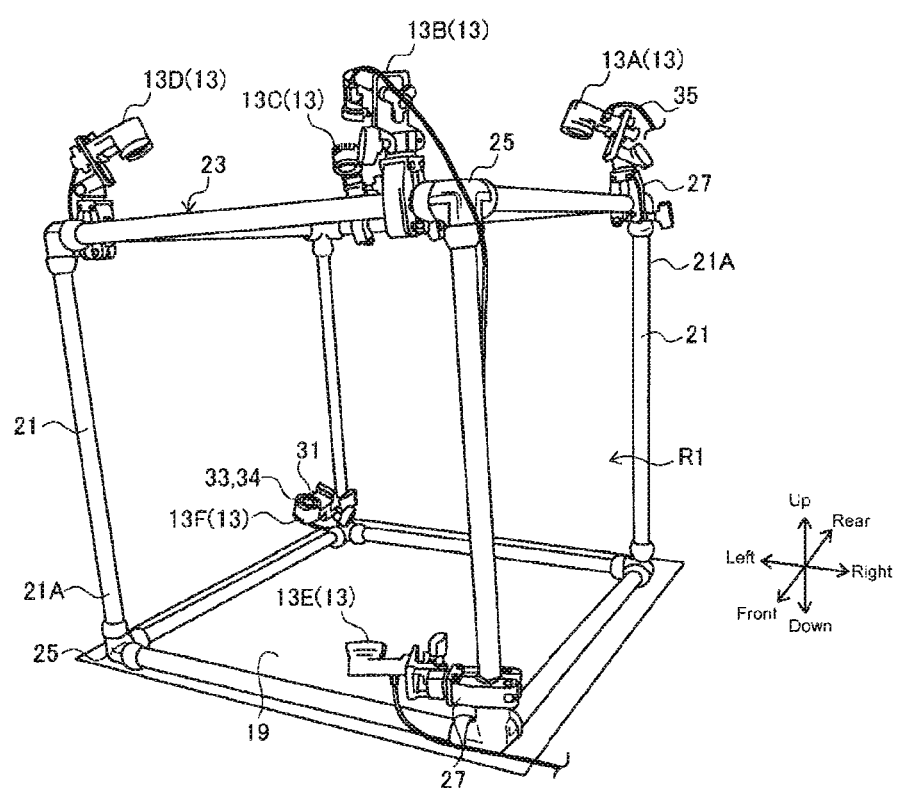
FIG. 2 is a perspective view of a frame section to which multiple cameras are attached.

As illustrated in FIG. 2, each of the multiple cameras 13 is attached to frame section 23 which is formed by assembling multiple (twelve in the present embodiment) pipes 21 in a rectangular parallelepiped shape. Each of the multiple pipes 21 is formed at the same length, and at the corner portion of the rectangular parallelepiped shaped frame section 23, three pipes 21 of the twelve pipes 21 are connected to each other by a connecting member 25. In each of connecting members 25, end section 21A of each of the three pipes 21 is inserted and held, and the three pipes 21 are fixed so as to be orthogonal to each other. Hereinafter, as illustrated in FIG. 2, description is given where a direction which is orthogonal to the placement surface of base 19 on which frame section 23 is disposed is referred to as the up-down direction, a direction which is orthogonal to the up-down direction and goes to the front and rear in FIG. 2 is referred to as the front-rear direction, and a direction which is orthogonal to the up-down direction and the front-rear direction is referred to as the left-right direction.

In teaching device 10 of the present embodiment, for example, a total of six of the cameras 13 are attached to frame section 23. Hereinafter, when it is necessary to distinguish the multiple cameras 13, as illustrated in FIG. 2, description is given with alphabetical letters appended to the reference numerals of the cameras 13. When it is not necessary to distinguish, description will be given by referring to the six cameras collectively as "camera 13". Of the six cameras 13, the four cameras 13A, 13B, 13C, and 13D are attached to four pipes 21 on upper side of frame section 23 by fixing members 27. Each of the four cameras 13A to 130 is attached to a position close to each of the four connecting members 25 on the upper side. Fixing members 27 fix each of the cameras 13A to 13D such that the imaging direction faces the center portion of frame section 23.

Of the six cameras 13, the remaining two cameras 13E and 13F are attached by fixing member 27 to each of the groups of pipes 21 which are diagonally opposed among the four pipes 21 which are provided along the up-down direction. The cameras 13E and 13F are attached to the lower end portion of the pipe 21 on the side of base 19, and are fixed by fixing member 27 so that the imaging direction faces the center portion of frame section 23. Since these six cameras 13 image marker sections 43 of jigs 15 (described later), a cube-shaped region which is surrounded by frame section 23 is set as a tracking region R1, that is, is set as a region for allowing jigs 15 and marker sections 43 to move and be tracked. In the six cameras 13, for example, in order to track marker sections 43, the imaging ranges are set to overlap each other and the tracking region R1 is able to be imaged three-dimensionally. The shape of frame section 23, the number of cameras 13, the attachment positions of cameras 13, and the like illustrated in FIG. 2 are examples and can be modified as appropriate.

As illustrated in FIGS. 1 and 2, each of the cameras 13 is provided with imaging device 31 and lighting devices 33 and 34. Imaging device 31 is a CCD image sensor or a CMOS image sensor, for example. Lighting devices 33 and 34 are LED lighting and radiate lights of different wavelengths from each other, for example. These are two kinds of light corresponding to marker sections 43A and 43B which are provided on each of the two jigs 15A and 15B (described later, refer to FIG. 4). Cameras 13 receive reflected light which is radiated from lighting devices 33 and 34 and reflected by marker sections 43A and 43B using imaging device 31. Cameras 13 output the imaged data to teaching device 10 via video cables 35 as captured image data D1. In cameras 13, in order to render the reflected light of marker sections 43A and 43B easy to detect, optical filters corresponding to the wavelengths of the lights which are radiated from lighting devices 33 and 34 may be attached to the light incidence ports of imaging devices 31.

Regarding Jigs 15

Next, description will be given of jigs 15 which are the detection targets. The jig 15 which is illustrated in FIG. 1 is a detection target body which mimics robot arms 101 and 103 of industrial robot 100 which is illustrated in FIG. 3, and is provided with main body section 41, marker section 43, end effectors 45, and gripping section 47. FIG. 3 schematically illustrates the configuration of industrial robot 100. Robot arm 101 is an articulated robot which is provided with a serial link mechanism which connects two arm sections 105 (an example of a moving section) in one direction and supports hand section 109 (an example of a working section) which is an end effector on a distal end portion. Similarly, robot arm 103 connects two arm sections 107 in one direction and supports hand section 111 on the distal end portion. Industrial robot 100, for example, drives robot arms 101 and 103 to perform work of attaching workpieces W1 and W2 which are pinched by hand sections 109 and 111 to board B. Workpieces W1 and W2 are electronic components, screws, or the like, for example.

Figure 4:
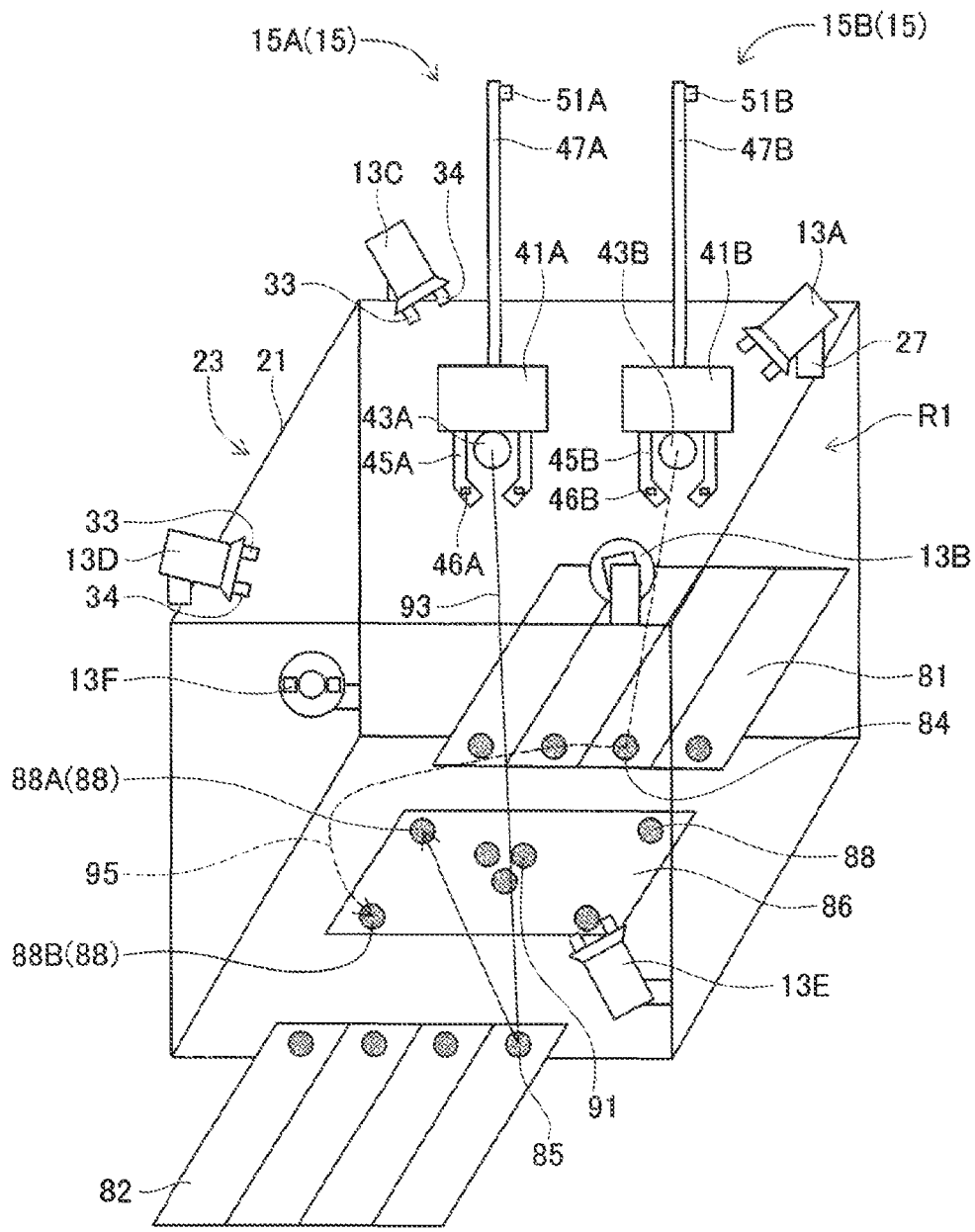
FIG. 4 is a schematic diagram illustrating a state in which motion capture is carried out using the teaching device of the present embodiment.
Figure 4:
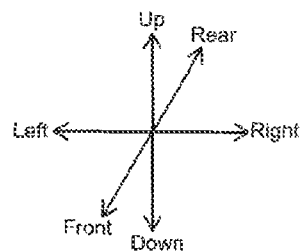

Main body section 41 of jig 15 which is illustrated in FIG. 1 corresponds to arm sections 105 and 107 of robot arms 101 and 103. Here, as described later, in teaching device 10 of the present embodiment, control information D5 is generated to operate two robot arms 101 and 103 in coordination. Therefore, two kinds of jig, 15A and 15B (refer to FIG. 4), are used to perform the motion capture, assuming that each of the jigs 15A and 15B is a different one of the robot arms 101 and 103, respectively. In the following description, when it is necessary to distinguish the two kinds of jig 15 or the parts (the marker sections 43 and the like) with which jigs 15 are provided, as illustrated in FIG. 4, description is given with alphabetical letters appended to the reference numerals of the jigs 15 and the like. When it is not necessary to distinguish, description will be given by referring to the two jigs collectively as "jig 15".

Marker section 43 is fixed to the outer circumferential portion of main body section 41. Marker section 43 is spherical and reflects the light which is emitted from lighting devices 33 and 34 of each of the cameras 13. For example, marker section 43A which is provided on jig 15A which is illustrated in FIG. 4 is configured using a material or the like which has reflective characteristics which reflect the light of specific wavelength which is emitted by lighting device 33. Marker section 43B which is provided on jig 15B is configured using a material or the like which has reflective characteristics which reflect the light of a specific wavelength which is emitted by lighting device 34.

End effectors 45 have a shape which mimics hand sections 109 and 111 which pinch workpieces W1 and W2 of robot arms 101 and 103 (refer to FIG. 3) and are configured using a pair of rod-shaped members, the distal end portions of which are bent toward a direction in which the distal end portions approach each other. The pair of end effectors 45 are provided in positions which interpose marker section 43 and are configured such that the distal end portions are capable of opening and closing. Movable section marker section 46 for tracking the movement of end effector 45 is provided on the distal end portion of each of the end effectors 45. For example, similarly to marker sections 43A and 43B, movable section marker sections 46A and 46B are configured with different reflective characteristics from each other and reflect the light which is emitted from each of the lighting devices 33 and 34 of camera 13. Accordingly, in the same manner as jig 15, control information generation device 17 is capable of acquiring positional information D2 of end effectors 45. Camera 13 may be provided with a dedicated lighting device which shines light on end effectors 45, separately from lighting devices 33 and 34 which are used in jig 15.

Actuator 49 for causing end effectors 45 to perform opening and closing operations is embedded in main body section 41. A distal end section of rod-shaped gripping section 47 is attached to main body section 41 at a portion of the opposite side from marker sections 43 and end effectors 45. For example, in a state in which jig 15 is inserted into tracking region R1 (refer to FIG. 2) of frame section 23, gripping section 47 is configured to be a length of a degree at which the user can hold the base end section of gripping section 47 which protrudes to the outside of frame section 23 by hand. Accordingly, a user is capable of manipulating jig 15 without inserting a portion of the body inside tracking region R1.

Drive switch 51 for driving or stopping actuator 49 is provided on the base end section of gripping section 47 on the opposite side from main body section 41. Drive switch 51 is connected to actuator 49 by connecting wire 53 which is installed inside gripping section 47 and main body section 41. For example, when performing the motion capture, a user holds the base end section of gripping section 47 and moves jig 15 which is provided on the distal end section from a start position to a desired position in the tracking region R1 of frame section 23, for example, to the working position at which robot arms 101 and 103 pinch workpieces W1 and W2 using hand sections 109 and 111. After the movement, the user sets the distal end portion of end effectors 45 to a closed state by performing an ON operation on drive switch 51. Alternatively, the user sets the distal end portion of end effectors 45 to an open state by performing an OFF operation on drive switch 51. Teaching device 10 tracks the operations of end effectors 45 and generates control information D5 (described later). Control information D5 is for controlling hand sections 109 and 100 of industrial robot 111 which is illustrated in FIG. 3.

Regarding Control Information Generation Device 17

Next, description will be given of the configuration of control information generation device 17. Control information generation device 17 is a personal computer which is configured using CPU 61 (Central Processing Unit) as the main component and is provided with converting section 63, memory section 65, input section 67, display section 69, and the like. Control information generation device 17 inputs captured image data D1 which is output from camera 13 to converting section 63 via video cable 35 (refer to FIG. 2). Converting section 63 aligns captured image data D1 which is captured by the multiple cameras 13 in chronological order, adds identification information of cameras 13, time information, and the like, and outputs the result to CPU 61. CPU 61 saves the captured image data D1 which is input from converting section 63 and saves the captured image data D1 in memory section 65. Memory section 65 is provided with a memory, a hard disk, and the like and, in addition to captured image data D1, control program D7, design information D6, and the like are saved in memory section 65. Control program D7 is a program which is executed by CPU 61. Design information D6 is information relating to industrial robot 100 which is illustrated in FIG. 3 and is information such as the external dimensions of arm sections 105 and 107 and the maximum movement speed of arm sections 105 and 107.

CPU 61 realizes various process modules of positional information generating section 71, movement information generating section 73, and control information generating section 75 by reading and executing control program D7 which is saved in memory section 65. In the present embodiment, positional information generating section 71 and the like are configured as software which is realized by control program D7 being executed by CPU 61; however, positional information generating section 71 and the like may be configured as dedicated hardware.

Input section 67 is an input device such as a keyboard or a mouse which receives input from a user. In teaching device 10 of the present embodiment, after moving jig 15 to the working position, end effectors 45 are opened or closed by manipulating drive switch 51, and it is possible to teach the generation of work information D3 for operating hand sections 109 and 111 (refer to FIG. 3) to teaching device 10. As another method, it is possible to instruct teaching device 10 that other work information D3 is to be generated by the user manipulating input section 67 after moving jig 15 to the working position. For example, the user can manipulate input section 67 and input work of adhering to workpieces W1 and W2, work of opening holes in portions of workpieces W1 and W2 by emitting a laser, work of applying an adhesive to workpieces W1 and W2, and the like. Accordingly, teaching device 10 is capable of generating control information D5 of the series of work tasks in which positional information D2 of jig 15 and the like and work information D3 are linked. Display section 69 displays various information such as midway information in the process of generating the control information D5 and post-generation result information.

Next, description will be given of an example of the generation process of control information D5 in control information generation device 17. First, description will be given of the working content in which the motion capture is performed. In the following description, as an example, the motion capture of the work of mounting workpieces W1 and W2 on board B while the two robot arms 101 and 103 (refer to FIG. 3) cooperate with each other to operate is performed. FIG. 4 schematically illustrates a state of a case in which the motion capture is carried out.

As illustrated in FIG. 4, for example, supply devices 81 and 82 for supplying workpieces W1 and W2 (refer to FIG. 3) are arranged inside tracking region R1 of frame section 23. Supply devices 81 and 82 are tape feeder type supply devices which feed electronic components (workpieces) which are taped to a supply position one at a time or are tray type supply devices which are provided with multiple trays in which electronic components are lined up at a predetermined interval. Supply position marker section 84 is provided at the supply position of workpiece W2 of supply device 81. Supply position marker section 85 is provided at the supply position of workpiece W1 of supply device 82. Supply device 81 and supply device 82 are arranged such that the supply positions (supply position marker sections 84 and 85) face each other in the front-rear direction.

Board 86 is arranged between supply devices 81 and 82 in the front-rear direction. Board 86 is formed in a longitudinal shape and is arranged horizontally such that the flat surface runs along the front-rear direction and the left-right direction. Mounting position marker sections 88 are provided on the four corner portions of board 86. In the following description, the mounting position marker section 88 at which jig 15A performs the mounting work will be referred to as mounting position marker section 88A so as to be distinguished from other mounting position marker sections 88. Mounting position marker section 88 at which jig 15B performs the mounting work will be referred to as mounting position marker section 88B so as to be distinguished from other mounting position marker sections 88. For supply devices 81 and 82 and board 86, actual devices and boards may be used, or members mimicking the shapes thereof may be used. Three reference marker sections 91 are provided adjacently on the center portion of board 86. Reference marker sections 91 are positions which serve as references to the operations of robot arms 101 and 103 (refer to FIG. 3).

For example, the work of picking up workpiece W1 from the supply position of supply device 82 (refer to FIG. 4) using hand section 109 of robot arm 101 which is illustrated in FIG. 3 and mounting workpiece W1 on board B is taught using jig 15A. In this case, as illustrated by a solid line arrow 93 of FIG. 4, the user holds gripping section 47A to manipulate jig 15A and moves jig 15A from the start position which is illustrated in FIG. 4 to supply position marker section 85. The user performs an ON operation on drive switch 51A at the position of supply position marker section 85 and sets end effector 45A to the closed state. Before manipulating drive switch 51A, the user manipulates input section 67 of control information generation device 17 to input work information D3 indicating that end effector 45A is to be manipulated. Next, the user moves jig 15A from supply position marker section 85 to the position of mounting position marker section 88A. The user performs an OFF operation on drive switch 51A at the position of mounting position marker section 88A and sets end effector 45A to the open state. Also in this case, before manipulating drive switch 51A, the user manipulates input section 67 to input work information D3 indicating that end effector 45A is to be manipulated.

The work of picking up workpiece W2 from the supply position of supply device 81 (refer to FIG. 4) using hand section 111 of robot arm 103 and mounting workpiece W2 on the board B is taught using jig 15B. This work is work which is performed at the same time as the work of robot arm 101. In this case, as illustrated by a broken line arrow 95 of FIG. 4, the user holds gripping section 47B to manipulate jig 15B and moves jig 15B from the start position which is illustrated in FIG. 4 to supply position marker section 84. After inputting work information D3 using input section 67, the user performs an ON operation on drive switch 51B at the position of supply position marker section 84 and sets end effector 45B to the closed state. Next, the user moves jig 15B from the supply position marker section 84 to the position of mounting position marker section 88B. After inputting work information D3 using input section 67, the user performs an OFF operation on drive switch 51B at the position of mounting position marker section 88B and sets end effector 45B to the open state. The user who manipulates jig 15B may be a different user from the user who manipulates jig 15A.

Figure 5:
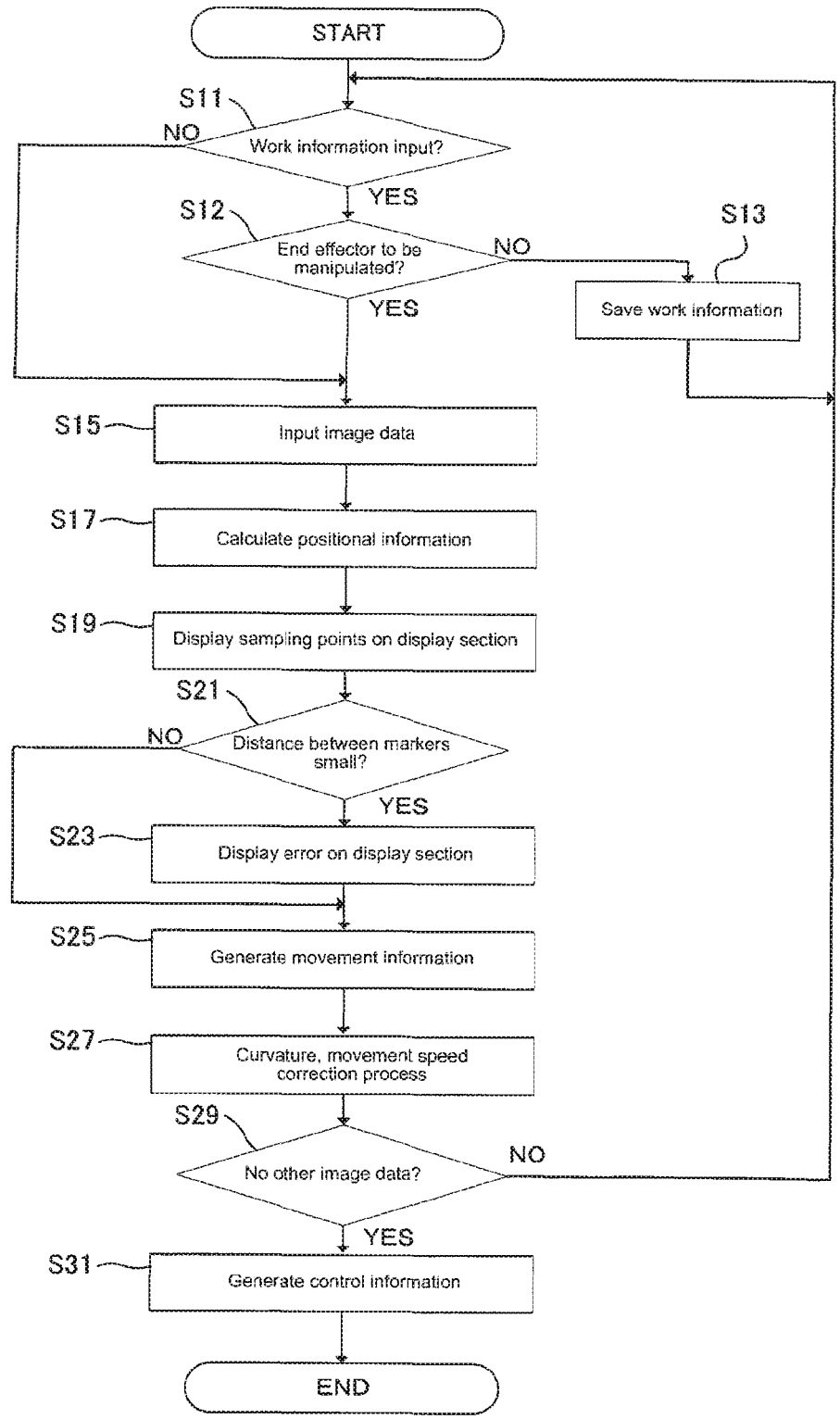
FIG. 5 is a flowchart illustrating a generation process of the control information by a CPU.

Next, during the motion capture, the process in which CPU 61 generates the control information D5 will be described with reference to the flowchart which is illustrated in FIG. 5. The content of the processes and the order of the processes of the flowchart which is illustrated in FIG. 5 are examples and may be modified as appropriate. Control information generation device 17 tracks the operations of jigs 15A and 15B to generate control information D5. Specifically, first, in step (hereinafter simply denoted as "S") 11 which is illustrated in FIG. 5 after executing control program D7 to start the process, CPU 61 determines whether the user has manipulated input section 67 to input work information D3. This is because, in a case in which the user manipulates input section 67 to input work information D3, a process corresponding to the content of work information D3 is performed. In a case in which work information D3 has been input (S11: YES), CPU 61 determines whether input work information D3 is information indicating that end effector 45 (drive switch 51) is to be manipulated (S12). In a case in which work information D3 has not been input (S11: NO), CPU 61 starts the processes of S15 onward.

In S12, in a case in which work information D3 does not indicate that end effector 45 is to be manipulated (S12: NO), CPU 61 adds control information corresponding to the kind of work information D3 which is input, for example, a program of a subroutine corresponding to work of adhering to the workpieces W1 and W2 to work information D3 and saves work information D3 in memory section 65 (S13). In the work of arrows 93 and 95 which are illustrated in FIG. 4, in a case in which there is no input of work information D3 of other than end effector 45 and, for example, jig 15 reaches a predetermined working position, the user is capable of manipulating input section 67 to input the work information such as suction work, laser emitting work, and adhesive application work. Accordingly, it becomes possible to add various work tasks and the like within the series of work processes of control information D5 which is generated.

In S12, in a case in which work information D3 which is input is information indicating that end effector 45 is to be manipulated (S12: YES), CPU 61 performs generation of positional information D2 and the like which is illustrated in S15 onward and generates control information D5 corresponding to the position, the inclination, the movement direction, and the like of movable section marker sections 46A and 46B of each of the end effectors 45A and 45B, that is, control information D5 which causes hand sections 109 and 111 (refer to FIG. 3) to perform desired operations. In the following description, a process of generating control information D5 based on captured image data D1 in which mainly marker section 43 of jig 15 is captured will be described. The process of generating control information D5 based on captured image data D1 in which movable section marker section 46 of actuator 49 is the same as with marker section 43, and thus will be omitted as appropriate.

Next, CPU 61 performs a process of taking in captured image data D1 from converting section 63 and saving the captured image data D1 in memory section 65 (S15). In order to notify the user of an error which is detected during the motion capture, CPU 61 of the present embodiment processes captured image data D1 of cameras 13 in real time. However, the configuration is not limited to real-time processing, and CPU 61 may, for example, store all of the captured image data D1 once in memory section 65 and later process all of the captured image data D1 together.

Next, positional information generating section 71 calculates the position in three-dimensional coordinates for each capture time of marker sections 43A and 43B which are attached to jigs 15A and 15B based on the identification information, the time information, and the like of cameras 13 which are attached to the captured image data D1 which is saved in memory section 65 (S17). Positional information generating section 71 saves the calculated positional information D2 in memory section 65. Positional information generating section 71 performs labeling on the captured image data D1 which is binarized, for example, and performs a process which uses an algorithm such as epipolar matching to calculate the position of the coordinates in three-dimensional space of marker sections 43A and 43B.

Positional information generating section 71 calculates the relative position of the coordinates with respect to reference marker sections 91. For example, positional information generating section 71 uses the centroid position of the three reference marker sections 91 as a reference to calculate the coordinate positions of marker sections 43A and 43B.

Each of marker sections 43A and 43B has a structure with different reflective characteristics according to the wavelengths of light which are radiated from lighting devices 33 and 34. Therefore, positional information generating section 71 identifies the reflected light from each of marker sections 43A and 43B using differences in the luminance or the like, for example, with respect to captured image data D1 and calculates the coordinate position for each of marker sections 43A and 43B. The processing method by which positional information generating section 71 calculates the coordinate position (positional information D2) is not particularly limited, and positional information D2 may be calculated by, for example, the principle of triangulation or the like. In S12, in a case in which work information D3 indicates that end effector 45 (drive switch 51) is to be manipulated (S12: YES), in the same manner as in the case of marker section 43, positional information generating section 71 generates positional information D2 for movable section marker section 46.

Figure 6:
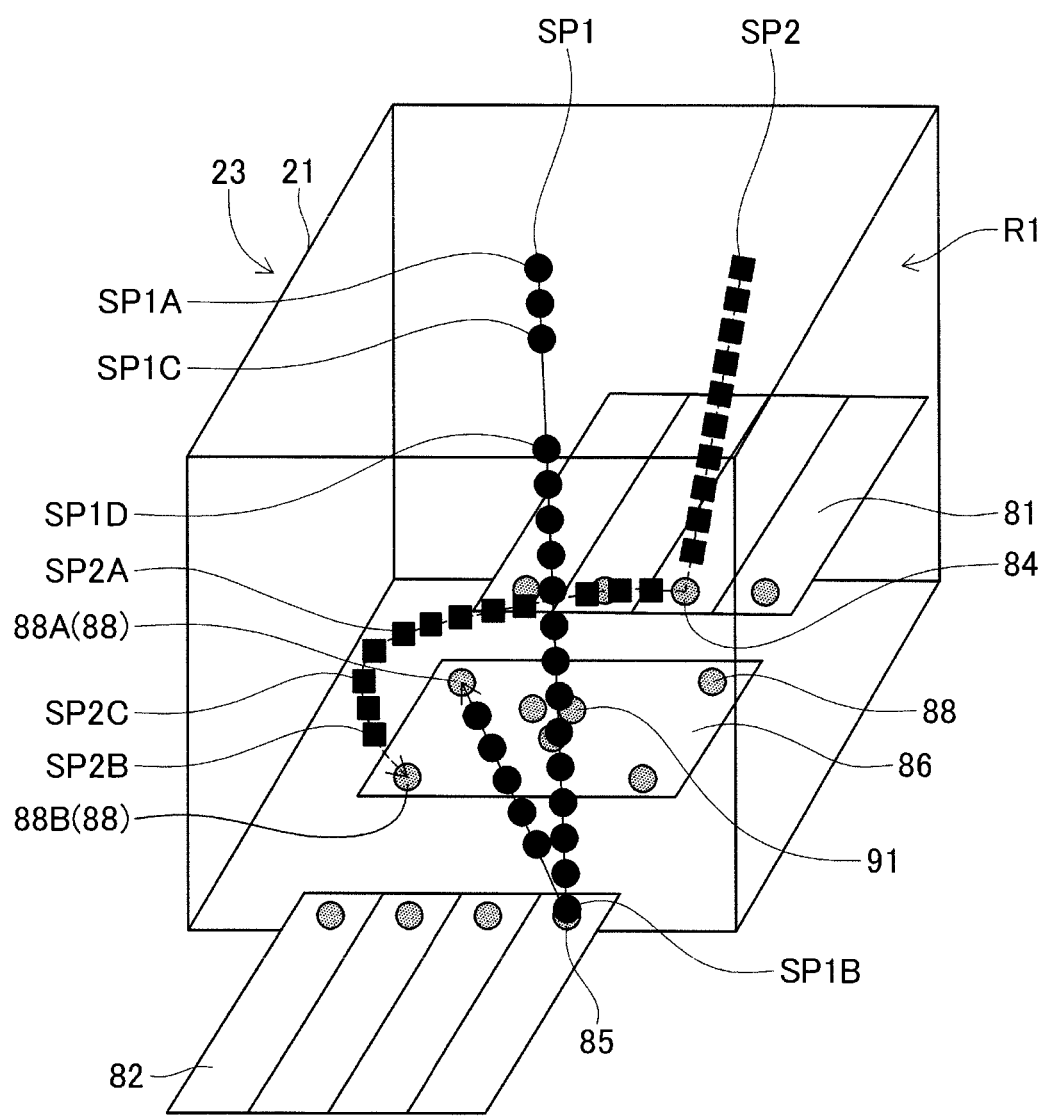
FIG. 6 is a diagram illustrating sampling points which are obtained by sampling positions of each marker section with which two jigs are provided.

Positional information generating section 71 performs a process of displaying positional information D2 on the display section 69 (S19). For example, as illustrated in FIG. 6, positional information generating section 71 acquires the positions of each of the marker sections 43A and 43B, sampling points SP1 and SP2 which are sampled every predetermined time as positional information D2. Positional information generating section 71 performs a process of displaying all of the acquired sampling points SP1 and SP2 (positional information D2) on display section 69 in real time. Accordingly, by checking the display of display section 69, the user is capable of checking the acquired positional information D2 as appropriate and determining whether the positional information D2 is appropriate. Positional information generating section 71 may display only feature points such as starting points, end points, and points in which the movement direction changed by greater than or equal to a predetermined angle without displaying all of the sampling points SP1 and SP2. The sampling points SP1 which are filled black circles illustrated in FIG. 6 correspond to marker section 43A of jig 15A. The sampling points SP2 which are filled black squares correspond to marker section 43B of jig 15B.

Next, positional information generating section 71 determines whether the distance between marker sections 43A and 43B is normal based on the sampling points SP1 and SP2 of positional information D2 (S21). Although the two jigs 15A and 15B mimic robot arms 101 and 103 which are illustrated in FIG. 3, in consideration of the manipulability by the hands of the user, it is conceivable to render the outer shape smaller than the actual objects. In this case, in a case in which robot arms 101 and 103 are moved based on control information D5 which is created by operating jigs 15A and 15B, there is a concern that arm sections 105 and 107 or the like will collide and interfere with each other.

Therefore, positional information generating section 71 sets a distance corresponding to the dimensions of the outer shape of arm section 105 from the center of marker section 43A, for example, as a distance at which a collision may occur based on design information D6 which is saved in memory section 65. In a case in which positional information generating section 71 calculates the distance between the sampling points SP1 and SP2 and determines that the calculated distance is less than or equal to the distance at which a collision may occur (S21: YES), positional information generating section 71 performs an error display on display section 69 (S23). Accordingly, the user is capable of recognizing that jigs 15A and 155 approach a distance at which arm sections 105 and 107 may collide, and it is possible to take appropriate measures such as redoing the motion capture or the like. Positional information generating section 71 may perform the determination, for example, by calculating the distance between the sampling points SP1 and SP2 at the same time. Alternatively, with respect to one sampling point 591, positional information generating section 71 may perform the determination by using the time of the sampling point SP1 as a reference to calculate the distance to the sampling point SP2 within a predetermined time.

After performing S23, positional information generating section 71 temporarily stops the process until there is a response from the user with respect to the error display, for example. Alternatively, when a predetermined time elapses, positional information generating section 71 delivers the necessary data and the like and moves the subject of the process to movement information generating section 73 (S25). In S21, in a case in which positional information generating section 71 determines that the calculated distance is greater than the distance at which a collision may occur (S21: NO), the positional information generating section 71 moves the subject of the process to movement information generating section 73 (S25).

Next, movement information generating section 73 generates movement information D4 which relates to the movement of marker sections 43A and 43B based on positional information D2 which is saved in memory section 65 (S25). Movement information generating section 73 calculates the physical quantities of the movement distance, the movement direction, the speed, the acceleration, the angle, and the like as movement information D4 of each of the marker sections 43A and 43B from positional information D2.

Extraction of Feature Points

For example, movement information generating section 73 performs extraction of feature points from among the multiple sampling points SP1 which are illustrated in FIG. 6. Specifically, as the feature point which serves as the starting point, for example, movement information generating section 73 extracts sampling point SP1A corresponding to the movement start position of jig 15A as a feature point. Movement information generating section 73 extracts points from among the multiple sampling points SP1 in which the movement direction is modified by greater than or equal to a predetermined angle, for example, a sampling point SP1B in which the movement direction is modified greatly at a position close to supply position marker section 85 as a feature point. The movement information generating section 73 may determine these feature points determined automatically based on the movement speed and the movement direction, or alternatively, the user may perform instruction by manipulating input section 67.

Movement information generating section 73 calculates the inclination from the coordinate positions of the extracted feature points (sampling points SP1A and SP1B) and detects the movement direction of marker section 43A (jig 15A). Alternatively, movement information generating section 73 divides the distance between the extracted feature points, for example, by the time between the feature points to detect the movement speed of marker section 43A.

Movement information generating section 73 may perform correction processing which approximates positional information D2 of sampling point SP1 between the feature points. For example, movement information generating section 73 sets the extracted feature points (sampling points SP1A and SP1B) as the starting point and the end point of the movement and corrects positional information D2 of sampling point SP1 between the feature points such that arm section 105 of robot arm 101 (refer to FIG. 3) is capable of moving from the starting point (sampling point SP1A) to the end point (sampling point SP1B). For example, in a case in which sampling point SP1 with a greatly deviated position is present between the feature points due to external noise, movement information generating section 73 discards positional information D2 relating to the relevant sampling point SP1 as unnecessary data. Alternatively, movement information generating section 73 approximates positional information D2 between the feature points with a straight line that joins the relevant feature points.

Movement information generating section 73 may approximate the feature points with a curved line. For example, among the multiple sampling points SP2 which are illustrated in FIG. 6, movement information generating section 73 extracts sampling points SP2A and SP2B in which the movement direction is modified by greater than or equal to a predetermined angle as feature points. The movement between the two feature points (sampling points SP2A and SP2B) moves in a curve while gradually changing the movement direction. In this case, for example, movement information generating section 73 uses sampling point SP2A as the starting point and sampling point SP2B as the end point to approximate positional information D2 of sampling point SP2 between the relevant feature points (sampling points SP2A and SP2B) using a curved line.

Calculation by Sampling

Movement information generating section 73 is not limited to this method using feature points and may detect the movement direction and the like using another method. For example, movement information generating section 73 may calculate the inclination of the coordinate positions of adjacent sampling points SP1 among the multiple sampling points SP1 which are sampled by positional information generating section 71 and detect the movement direction of marker section 43A (the jig 15A). Alternatively, for example, movement information generating section 73 may multiply the distance between the adjacent sampling points SP1 by the sampling cycle of the positional information generating section 71 to detect the movement speed of marker section 43A.

In a case in which at least one of the curvature of the curved line joining sampling points SP1 and SP2 and the detected movement speed exceeds the movement capability of industrial robot 100 which is illustrated in FIG. 3, movement information generating section 73 corrects positional information D2 and performs generation of movement information D4 again (S27). For example, as illustrated in FIG. 6, in sampling point SP2C which is one point among the multiple sampling points SP2, marker section 43B moves in a greatly curved manner. In a case in which the curved movement exceeds the movement capability of actual robot arm 103, even if control information D5 is generated, it is difficult to control robot arm 103.

Therefore, for example, in a case in which the curvature joining the sampling points SP2 (for example, between sampling points SP2A and SP2B) is large in comparison to the curvature which is set according to the movement capability of robot arm 103 based on design information D6 which is saved in memory section 65, movement information generating section 73 corrects positional information D2 to obtain a curvature at which the movement is possible. Movement information generating section 73 generates movement information D4 again based on the post-correction positional information D2 (sampling points SP2).

For example, as illustrated in FIG. 6, the distance between the sampling points SP1C and SP1D which are two points among the multiple sampling points SP1 is large. When the distance between the sampling points SP1C and SP1D is large, the movement speed of the calculation results also becomes swifter. In a case in which the movement speed exceeds the movement capability of the actual robot arm 103 or exceeds a safe movement speed, even if control information D5 is generated in the same manner as with the previously described curvature, it is difficult to control robot arm 103.

Therefore, for example, in the same manner as in the case of the curvature, in a case in which the movement speed which is calculated from the distance between the sampling points SP1C and SP1D is great in comparison to the maximum movement speed of robot arm 103 based on design information D6 which is saved in memory section 65, movement information generating section 73 performs a process of correcting positional information D2 to obtain a speed at which the movement is possible. Movement information generating section 73 generates movement information D4 again based on post-correction positional information D2 (the sampling points SP1C and SP1D). In a case in which movement information generating section 73 corrects sampling points SP1 and SP2 (positional information D2) according to the curvature and the movement speed, movement information generating section 73 performs correction such that the distance between the post-correction sampling points SP1 and SP2 is greater than or equal to a distance at which the collision may occur.

When the correction process (S27) by movement information generating section 73 is completed, CPU 61 performs a query as to whether there is captured image data D1 which is not taken into converting section 63 (S29). In a case in which there is captured image data D1 which is not taken in (S29: NO), CPU 61 performs the process from S11 again.

In a case in which there is no captured image data D1 to take in from converting section 63 (S29: YES), CPU 61 instructs control information generating section 75 to generate control information D5. Control information generating section 75 generates control information D5 of a series of work tasks which move robot arms 101 and 103 and cause hand sections 109 and 111 to work at the working positions based on positional information D2, movement information D4, and work information D3 which are saved in memory section 65 (S31). In a case in which there is work information D3 which is yet to be processed, for example, work information D3 which is input by the user manipulating input section 67 after causing jigs 15A and 15B to reach the positions of mounting position marker sections 88A and 88B and ending the imaging, it is preferable that control information generating section 75 processes the relevant work information D3 also.

Control information generating section 75 generates control information D5 which causes arm sections 105 and 107 (refer to FIG. 3) to operate at positions and movement speeds corresponding to positional information D2 and movement information D4 of marker sections 43, for example. Control information generating section 75 detects the positions, orientations, and the like of end effectors 45 (hand sections 109 and 111) based on positional information D2 which is generated from captured image data D1 of movable section marker section 46. Control information generating section 75 adds control of rotating and opening and closing hand sections 109 and 111 to control information D5 which causes arm sections 105 and 107 to move. Accordingly, after moving arm sections 105 and 107 to predetermined working positions (supply position marker sections 84 or the like of FIG. 4), control information generating section 75 is capable of generating control information D5 of a series of work tasks of pinching workpieces W1 and W2 using hand sections 109 and 111.

In S31, control information generating section 75 performs a process of adding the correction work to control information D5. Specifically, for example, after moving arm sections 105 and 107 to the supply positions (the positions of supply position marker sections 84 and 85) of supply devices 81 and 82 and before carrying out the pinching work of workpieces W1 and W2 by hand sections 109 and 111, control information generating section 75 adds the information which corrects the error of the supply position of supply device 82 and the positions of hand sections 109 and 111 to control information D5. For example, in a case in which a camera which images board B or the like is installed on hand section 109 of robot arm 101, a process of imaging the supply position of supply device 82 using the relevant camera and correcting the error of the relative position between hand section 109 and the supply position based on the captured image data is added to control information D5. In this manner, teaching device 10 is capable of performing motion capture to generate control information D5.

Note that, in the embodiment, camera 13 is an example of a detecting section. Marker section 43 is an example of a positional marker section. End effector 45 is an example of a movable section. Actuator 49 is an example of a driving section. CPU 61 is an example of a processing section. Robot arms 101 and 103 are an example of a robot. Arm sections 105 and 107 are an example of a moving section. Hand sections 109 and 111 are an example of a working section. Captured image data D1 is an example of detection data. Sampling points SP1A, SP1B, SP2A, and SP2B are examples of feature points. The process of S17 is an example of a positional information generation process. The process of S25 is an example of a movement information generation process. The process of S31 is an example of a control information generation process.

The present embodiment exhibits the following effects.

Effect 1

Teaching device 10 generates control information D5 for controlling robot arms 101 and 103 which are provided with arm sections 105 and 107 and hand sections 109 and 111 which are illustrated in FIG. 3. Teaching device 10 is provided with input section 67 for inputting work information D3 such as work of pinching workpieces W1 and W2 which is carried out by hand sections 109 and 111 at working positions. When carrying out the motion capture by moving jig 15 which is provided with marker sections 43, the user manipulates input section 67 at the appropriate timing to input the working content to be performed by industrial robot 100 as work information D3, and thus it is possible to set fine working content of hand sections 109 and 111 in teaching device 10. Accordingly, teaching device 10 is capable of generating control information D5 of the series of work tasks in which positional information D2 of jig 15 and the like and work information D3 are linked.

Effect 2

In jig 15, actuator 49 is driven by the manipulation of drive switch 51. End effector 45 to which movable section marker section 46 is attached is driven according to the driving of actuator 49. During the motion capture, control information generation device 17 tracks the operations of movable section marker section 46 which is capable of moving according to the driving of actuator 49. Accordingly, in comparison to a case in which the user mimics using their fingers by causing end effector 45 to operate using actuator 49 at a predetermined working position, it is possible to more faithfully reproduce the operations of gripping workpieces W1 and W2 and the like.

Effect 3

In S31, after moving arm sections 105 and 107 to the supply positions (the positions of supply position marker sections 84 and 85) of supply devices 81 and 82 and before carrying out the pinching work of workpieces W1 and W2 by hand sections 109 and 111, control information generating section 75 adds the information which corrects the error of the supply position of supply device 82 and the positions of hand sections 109 and 111 to control information D5. In a case in which jig 15 is moved by the hand of the user, the precision of the movement of marker section 43 relies on the precision of the user manipulating jig 15. In contrast, due to control information generating section 75 adding the information which carries out the positional correction before carrying out the work at the working position to control information D5, it becomes possible to generate control information D5 which is capable of supporting work in which a high precision is demanded.

Effect 4

In S25, movement information generating section 73 extracts feature points from among multiple sampling points SP1 which are illustrated in FIG. 6, calculates the inclination between the feature points and the like from the coordinate positions of the extracted feature points (for example, sampling points SP1A and SP1B), and detects the movement direction of marker section 43A (jig 15A). Movement information generating section 73 performs correction process of approximating positional information D2 of the sampling point SP1 between the feature points. Accordingly, it is possible to cause robot arms 101 and 103 to operate more smoothly based on the generated control information D5 and to omit wasteful operations to improve the work efficiency.

Effect 5

Movement information generating section 73 may calculate the inclination of the coordinate positions of adjacent sampling points SP1 among the multiple sampling points SP1 which are sampled by positional information generating section 71 and detect the movement direction of marker section 43A (jig 15A) as another processing method from the feature points. Alternatively, for example, movement information generating section 73 may multiply the distance between the adjacent sampling points SP1 by the sampling cycle of positional information generating section 71 to detect the movement speed of marker section 43A. In this configuration, by modifying the time of the sampling cycle, it is possible to adjust the precision with which the position, the movement direction, and the movement speed of marker section 43 are detected.

Effect 6

In S27, in a case in which the curvature or the like of the curved line joining the sampling points SP1 and SP2 exceeds the movement capability of industrial robot 100, movement information generating section 73 corrects positional information D2 and performs the generation of movement information D4 again. Accordingly, it is easy to optimize the movement capability of industrial robot 100 which actually controls generated control information D5 and use control information D5 as the data for controlling industrial robot 100.

Effect 7

In S17, positional information generating section 71 uses the centroid position of the three reference marker sections 91 as a reference to calculate the relative coordinate positions of marker sections 43A and 43B. Accordingly, in a case in which the generated control information D5 is used, by aligning the centroid position of the reference marker section 91 to the reference inside the actual working region, for example, the center position of board B which is illustrated in FIG. 3, it is possible to precisely control industrial robot 100.

Note that, the present disclosure is not limited to the embodiment described above, and it is possible to carry out the present disclosure in various modes subjected to various modifications and improvements based on the knowledge of a person skilled in the art.

For example, in the embodiment, the multiple jigs 15A and 15B are used; however, the configuration is not limited thereto, and one or three or more jigs 15 may be used. Multiple items of control information D5 which are acquired by operating a single jig 15 multiple times may be combined later.

Figure 7:
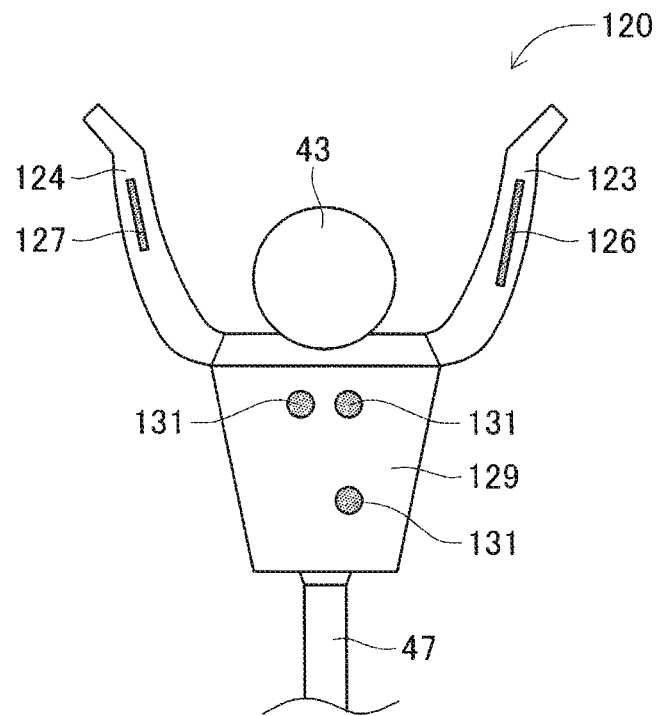
FIG. 7 is a schematic diagram illustrating a jig of another example.

In the embodiment, the configuration of jig 15, the position of movable section marker section 46, and the like are examples and may be modified as appropriate. FIG. 7 illustrates jig 120 of another example. In the following description, where the configuration is the same as the embodiment, the same reference numerals will be assigned and description thereof will be omitted as appropriate. A pair of end effectors 123 and 124 of jig 120 have a curved shape opening to the outside and marker section 43 is provided therebetween. Each of the end effectors 123 and 124 is provided with movable section marker 126 or 127 which have different shapes. Movable section markers 126 and 127 are long rectangular shapes on one side and are arranged toward the extending directions of end effectors 123 and 124. Movable section marker 126 is long in comparison to movable section marker 127. In this configuration, by providing a difference in not only the reflective characteristics but also the shapes of movable section markers 126 and 127, it is possible to facilitate the detection of the orientation and the inclination of jig 120 in the up-down direction.

Three main body section marker sections 131 are provided on main body section 129 of jig 120. The three main body section marker sections 131 are provided in positions which form the vertexes of a right angled triangle, for example, so that the distances between each other are different. In this configuration, for example, it is possible to detect each of the positions of the three main body section marker sections 131 and detect the inclination and the like of jig 120 using an algorithm which uses the principle of triangulation or the like.

Figure 8:
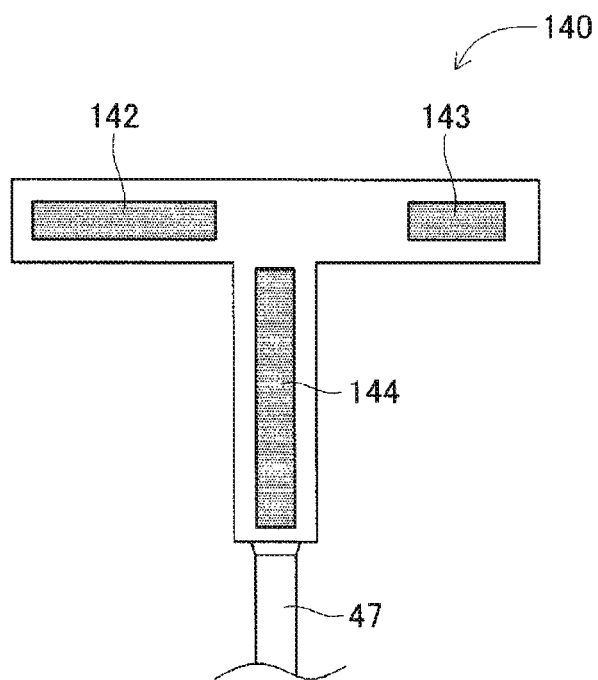
FIG. 8 is a schematic diagram illustrating a jig of another example.

As illustrated in FIG. 8, jig 140 which is not provided with end effector 45 may be used. Jig 140 illustrated in FIG. 8 is T-shaped, and marker sections 142, 143, and 144 are provided on portions extending in three orthogonal directions, respectively. Marker sections 142 to 144 are long rectangular shapes on one side and have different lengths from each other. Even if the jig 140 of this configuration is used, it is possible to teach the position, the movement direction, and the like of arm sections 105 and 107 to control information generation device 17.

Figure 9:
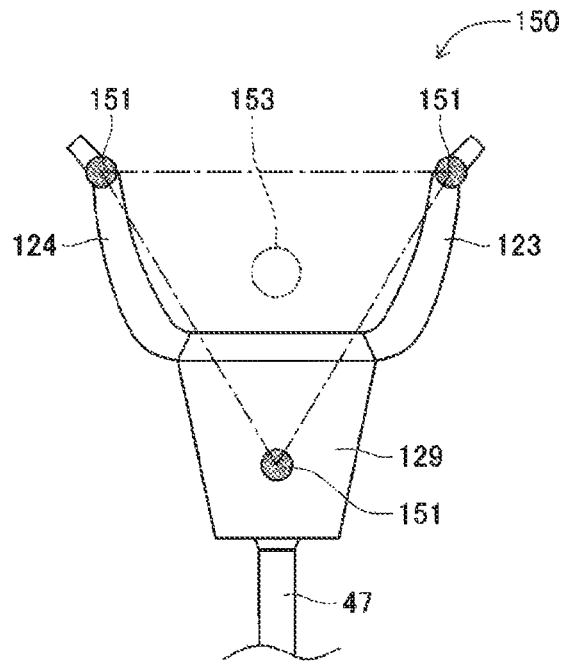
FIG. 9 is a schematic diagram illustrating a jig of another example.
Figure 10:
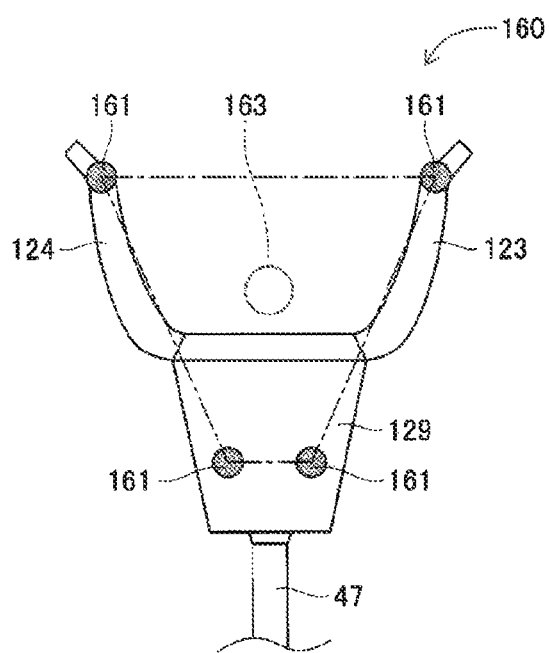
FIG. 10 is a schematic diagram illustrating a jig of another example.

In the embodiment, marker section 43A of jig 15A is configured to have the reflective characteristics which reflect the light of the specific wavelength which is emitted by lighting device 33 and marker section 43B of jig 15B is configured to have the reflective characteristics which reflect the light of the specific wavelength which is emitted by lighting device 34, and although the two marker sections 43A and 43B are identified by providing a difference in the reflective characteristics, the identification method is not limited thereto. For example, as illustrated in FIG. 9, three marker sections 151 may be provided in one jig 150, and as Illustrated in FIG. 10, four marker sections 161 may be provided in another jig 160, and each may be grouped and identified. In the following description, where the configuration is the same as jig 120 of FIG. 7, the same reference numerals will be assigned and description thereof will be omitted as appropriate.

As illustrated in FIG. 9, each of the three marker sections 151 is provided on the distal end section of end effector 123, the distal end section of end effector 124, and the center portion of main body section 129, respectively, and as illustrated by the dot-dash line in FIG. 9, are provided at the positions of the vertexes of an approximately equilateral triangle. As illustrated in FIG. 10, the four marker sections 161 are provided on the distal end section of end effector 123, the distal end section of end effector 124, and the end sections (the end sections of both the left and right sides in FIG. 10) of main body section 129, respectively, and as illustrated by the dot-dash line in FIG. 10, are provided at positions which configure a trapezoid. Therefore, centroid position 153 of marker sections 151 and centroid position 163 of marker sections 161 are at different positions from each other.

For example, as the initial settings before performing the motion capture, control information generation device 17 images jig 150 which is inserted into tracking region R1, groups the three marker sections 151, and sets centroid position 153 of marker sections 151 as the detection target. Similarly, control information generation device 17 images jig 160, groups the four marker sections 161, and sets centroid position 163 of marker sections 161 as the detection target.

Accordingly, by carrying out the matching of positional information D2 (the coordinate positions) which is extracted from captured image data D1 in group units of each of marker sections 151 and 161 which are grouped, it is possible to prevent confusion of the positions and the movement directions of each of the marker sections 151 and 161 (centroid positions 153 and 163) and to perform the detection precisely. Since centroid positions 153 and 163 of marker sections 151 and 161 differ from each other, the matching of the extracted coordinate positions and marker sections 151 and 161 is simple. For example, even if the position of one of the three marker sections 151 cannot be detected, by interpolating the position of marker section 151 which cannot be detected based on the positional information of the other marker sections 151 and acquiring centroid position 153, it is possible to prevent the loss of the position.

The identification method of the two marker sections 43A and 43B is not limited to the reflective characteristics and the grouping, and the identification may be performed by making the colors, the sizes, the shapes, and the like of the two marker sections 43A and 43B different from each other. Alternatively, different characteristics may be attributed by a combination of these so as to identify marker sections 43A and 43B. Alternatively, marker sections 43A and 43B may be configured using LEDs of different emission colors or the like, and marker sections 43A and 43B themselves may be caused to emit light.

In the embodiment, CPU 61 corrects positional information D2 based on the curvature and the movement speed in S27; however, the configuration is not limited thereto, and positional information D2 may be corrected based on the maximum acceleration of industrial robot 100.

In the embodiment, input section 67 is manipulated to input work information D3 in real time; however, the configuration is not limited thereto. For example, a specific marker section may be registered in advance and control information generation device 17 may save the timing at which the specific marker section is detected in control information D5 as information of the timing at which to add work information D3. After the generation of control information D5, the user may search for the information of the timing at which to insert work information D3 which is saved in control information D5 and add necessary work information D3. In the configuration of the related art, it is necessary to search for which point in the main program at which to add the necessary subroutine while viewing the content of the main program. In contrast, according to the method, since the point at which to add is set in advance, it is easy to add the subroutine. In this case, the specific marker section is an example of an input section in the present application.

In the embodiment, since positional information generating section 71 corrects shaking caused by the manual work of the user, positional information generating section 71 may perform a process of correcting the generated positional information D2 (the coordinate positions).

For control information D5, only the feature points (the starting point, passing points, and an arrival point) may be extracted without using all of the positional information D2 which are generated by positional information generating section 71, and control information D5 which enables the movement of a linear path joining the feature points may be generated.

A description is given of an example in which the configuration is applied to robot arms 101 and 103 as the robot in the present application; however, the configuration is not limited thereto. For example, the robot in the present application may be a robot which is provided with a working section which performs work tasks such as suction of electronic components, emitting of a laser beam, or screwing. The robot is not limited to a robot which is provided with a serial link mechanism and may be a robot which operates orthogonally to X- and Y-axis directions, or a robot which is provided with a parallel link mechanism.

In the embodiment, description is given of motion capture which uses an optical system; however, the motion capture in the present application may use another method, for example, may be a magnetic system which detects the operation of a magnetic sensor. For example, a magnetic sensor which transmits positional data may be attached to the jig 15 and a receiving device which receives the positional data may be attached instead of camera 13. In this case, the relevant magnetic sensor corresponds to a positional marker section which indicates the position of the moving section in the present application. And, the receiving device corresponds to the detecting section.

REFERENCE SIGNS LIST

10: teaching device, 13: camera (detecting section), 15: jig, 43: marker section (positional marker section), 45: end effector (movable section), 46: movable section marker section, 49: actuator (driving section), 61: CPU (processing section), 67: input section, 91: reference marker section, 101, 103: robot arm (robot), 105, 107: arm section (moving section), 109, 111: hand section (working section), D1: captured image data (detection data), D2: positional information, D3: work information, D5: control information, SP1, SP2: sampling point, SP1A, SP1B, SP2A, SP2B: sampling point (feature point).

The invention claimed is:

1. A teaching device which generates control information for controlling operations of a robot that is provided with a moving section and a working section which is provided on the moving section, the teaching device comprising:
   a jig which includes
      a main body corresponding to the moving section of the robot,
      end effectors on a first side of the main body, the end effectors including rod-shaped members corresponding to the working section of the robot that pinches a work piece, and
      a positional marker section fixed to the main body indicating a position of the main body;
   a detecting section including a camera which detects the positional marker section which moves together with movement of the jig;
   an input section which inputs work information at a working position in a state in which the jig has been moved to a specified work position, the work information including information directing operation of the end effectors; and
   processing circuitry which processes detection data which is obtained by the detecting section detecting the positional marker section and the work information from the input section,
   wherein the processing circuitry performs
      a positional information generation process of generating positional information of three-dimensional coordinates of the positional marker section based on the detection data,
      a movement information generation process of generating movement information relating to a movement direction and a movement speed of the positional marker section based on the positional information, and
      a control information generation process of generating the control information of a series of work tasks which cause the moving section to move according to the positional information and the movement information and cause the working section to perform work according to the work information.

2. The teaching device according to claim 1,
wherein the jig includes an actuator which drives the end effectors, and a movable section marker section indicating a position of distal ends of the end effectors relative to the main body, and
wherein the processing circuitry generates the positional information of the movable section marker section which moves together with the end effectors based on the driving of the actuator as the positional information generation process.

3. The teaching device according to claim 1,
wherein in the control information generation process, after moving the moving section, the processing circuitry adds control information for correcting a position of the working section at the working position as the control information to be performed before carrying out the work of the working section.

4. The teaching device according to claim 1,
wherein in the positional information generation process, the processing circuitry performs a correction process of extracting multiple feature points from among the generated positional information and approximating the positional information between the feature points.

5. The teaching device according to claim 1,
wherein as the positional information generation process, the processing circuitry samples a position of the positional marker section based on the detection data and generates a position of a sampling point as the positional information.

6. The teaching device according to claim 5,
wherein as the movement information generation process, the processing circuitry detects the movement direction based on a positional relationship between adjacent sampling points in multiple of the sampling points which are generated by the positional information generation process and measures the movement speed based on a distance between the adjacent sampling points and a sampling cycle.

7. The teaching device according to claim 6,
wherein as the movement information generation process, the processing circuitry corrects the positional information in a case of at least one of a case in which a curvature of a curved line joining the sampling points exceeds a predetermined curvature, a case in which the movement speed exceeds a predetermined speed, and a case in which an acceleration in the movement speed exceeds a predetermined acceleration.

8. The teaching device according to claim 1, further comprising:
a reference marker section which is provided in a position which serves as a reference to operations of the robot,
wherein the detecting section detects the reference marker section, and
wherein in the positional information generation process, the processing circuitry generates a relative position of the positional marker section with respect to the reference marker section as the positional information.

9. The teaching device according to claim 1,
wherein the robot includes a serial link mechanism as a driving mechanism of the moving section.

10. A control information generation method for controlling operations of a robot that is provided with a moving section and a working section which is provided on the moving section, the method comprising:
causing a teaching device including a jig which includes a main body corresponding to the moving section of the robot, end effectors on a side of the main body, the end effectors including rod-shaped members corresponding to the working section of the robot that pinches a work piece, and a positional marker section fixed to the main body indicating a position of the main body, a detecting section including a camera which detects the positional marker section which moves together with movement of the jig, and an input section which inputs work information at a working position in a state in which the jig has been moved to a specified work position, the work information including information directing operation of the rod-shaped members, to perform
a positional information generation step of generating positional information of three-dimensional coordinates of the positional marker section based on detection data which is obtained by the detecting section detecting the positional marker section,
a movement information generation step of generating movement information relating to a movement direction and a movement speed of the positional marker section based on the positional information, and
a control information generation step process of generating the control information of a series of work tasks for causing the moving section to move according to the positional information and the movement information and causing the working section to perform work according to the work information.

11. The teaching device according to claim 1,
wherein the camera is one of a plurality of cameras included with the detecting section, the plurality of cameras surrounding the jig.

12. The teaching device according to claim 2,
wherein the jig includes a drive switch to drive and stop the actuator that is provided on a gripping section that extends from a second side of the main body.

13. The teaching device according to claim 12,
wherein the gripping section is rod-shaped and configured to be held while moving the jig.

14. The teaching device according to claim 1,
wherein the jig is a first jig corresponding to a first robot arm of the robot and the teaching device includes a second jig corresponding to a second robot arm of the robot, and
wherein the processing circuitry is configured to determine whether the first jig and the second jig are within a predetermined distance that corresponds to a collision of the first robot arm and the second robot arm.

15. The teaching device according to claim 14,
wherein the processing circuitry is configured to communicate an error message when the first jig and the second jig are within the predetermined distance.

* * * * *